Oct. 3, 1961     R. C. MAXWELL     3,002,518

PORTABLE AND COLLAPSABLE AUTO DRESSING SCREEN

Filed June 24, 1957

INVENTOR.
ROBERT C. MAXWELL
BY
ATTORNEY

United States Patent Office 3,002,518
Patented Oct. 3, 1961

3,002,518
PORTABLE AND COLLAPSABLE AUTO DRESSING SCREEN
Robert C. Maxwell, Lexington, Ga.
Filed June 24, 1957, Ser. No. 667,345
1 Claim. (Cl. 135—8)

This invention relates to a portable and collapsible auto dressing screen and especially to a device of that sort constructed from a bracket arrangement positionable on the outside of an automobile or the like to hold a flexible beach towel or similar flexible curtain-like cover to form a dressing enclosure.

The present device has particular application in situations where it is desired to make quick changes of clothes in a public area such as a beach resort when no real building or other enclosure can be conveniently used. This occurs frequently where the people are visiting the beach in an automobile and it is very difficult to make swimsuit changes in the auto without being able to stand up. The present device provides a sheltered or screened enclosure outside the car which can be used standing up to change clothes without being visible to any one around.

Generally described, without regard to the scope of invention found in the claims hereinafter, the invention comprises a bracket arrangement for hanging on the rain gutter or other part of an automobile or the like and which bracket has a socket arrangement adapted to receive detachably one end respectively of a pair of ring members whose other ends are positionable in close proximity to form a support member on said bracket, and a curtain-like member which is preferably a common beach towel with a hem having the support member inserted therein so as to depend therefrom forming a screen enclosure alongside the automobile. The bracket of this invention may be formed from one plate having the sockets punched therefrom, and having a lip member punched from the back thereof to fit onto the automobile gutter edge and, if desired, clothes hooks may be punched from said plate and a rubber bumper provided on the back to contact the automobile.

A primary object of this invention is to provide a collapsible dressing screen, of flexible material or the like, which may be hung from the side of a vehicle temporarily.

An additional object of this invention is to provide an automobile dressing screen which utilizes a flexible material for the screen which material may also be used as a beach towel.

Another object of this invention is to provide a support bracket for a collapsible screen which bracket can be made from a small plate member.

Also an object of this invention is the provision of detachable support arms in several sections for detachable positioning on a bracket which can be attached on an edge of the automobile body.

Other and further objects and advantages of my invention will be apparent from the following description taken in conjunction with the accompanying drawings, in which.

Figure 1:
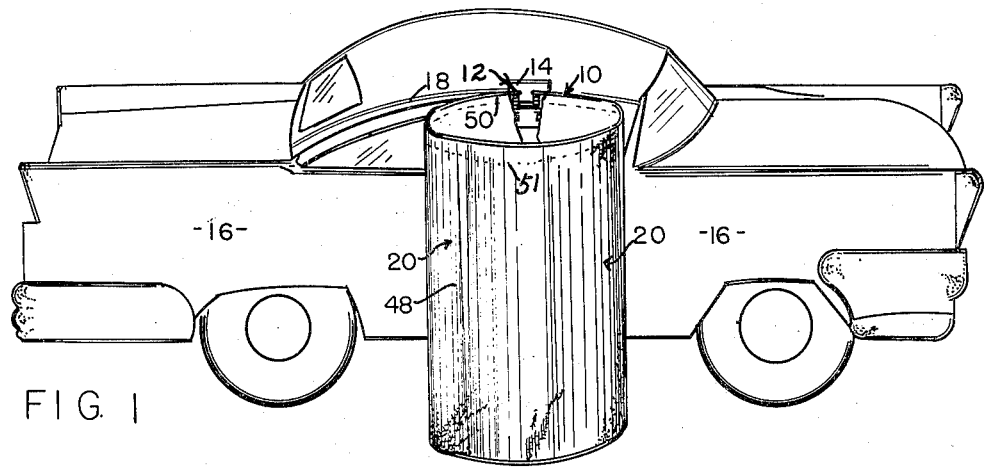
FIG. 1 is a perspective view of a conventional automobile with the present invention hung therefrom in normal position for use.
Figure 2:
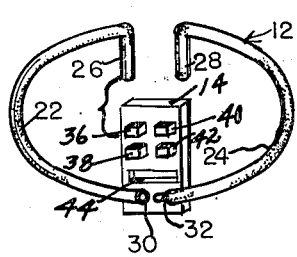
FIG. 2 is an isometric view of the support arms and the support bracket dis-assembled and in assembly position.
Figure 3:
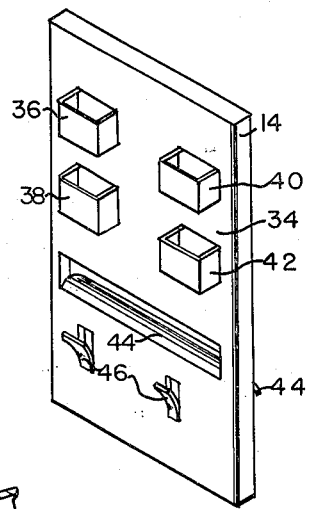
FIG. 3 is an isometric view of the attaching plate.

Referring to the overall, assembled device 10 in FIG. 1, it is seen that a support frame 12 held by a bracket member 14 is positioned on a conventional automobile 16 at the usual rain gutter top strip 18 and from said support frame 12 depends in curtain-like fashion the flexible curtain or screen 20 forming a partial or complete enclosure at the automobile side.

In more detail, the frame support 12 consists of a pair of arcuate support members 22, 24 having on each one a depending lug or attachment protrusion 26, 28, respectively, at one end thereof and member 22 having an open socket 30 at its other end while member 24 is formed into a plug or tip 32 at its other end for insertion into the socket 30 to form a smooth, continuous member.

The support frame 12 members 22, 24 cooperate detachably with the mounting bracket 14 which is preferably formed from a flat, rectangular metal plate 34 with two pairs of opposed, closed socket members 36, 38 and 40, 42, respectively, which receive respectively one of the attachment protrusions 26, 28 of a respective arcuate support member 22, 24 thereon. Formed from the plate 34 at the back thereof is an attachment lip or tab 44 extending the width of plate 34 and of a shape complementary to the usual shape of the rain gutter strip 18. At the bottom of plate 34, opposed hooks 46 are formed.

Figure 4:
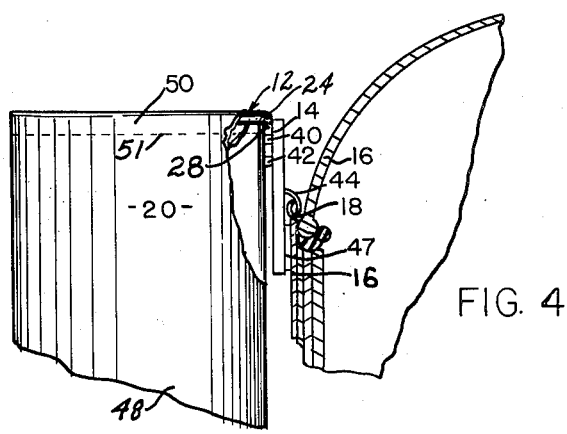
FIG. 4 is a side elevation view of the invention positioned on the automobile rain gutter and showing the automobile body in broken section.

One advantage incorporated into the present embodiment is found in the formation of plate 34. Beginning with a flat rectangular metal plate 34, the bracket member 14 is completely formed with a simple punching operation. Socket members 36, 38 and 40, 42 are punched out from the back to the front; and the tab 44 is punched out from the front to the back. The hooks 46 are also punched from back to front at the same time as punching the sockets 36, 40, if desired. Therefore, manufacturing is simple and inexpensive. The back of plate 34 is provided with a rubber bumper 47, such as a flat, thick piece of cushion rubber plate, as seen in FIG. 4.

For the main cover screen or curtain 20 a flexible section of initially flat material 48, such as terry cloth or heavy cotton muslin, is provided and formed at one edge with a closed hem 50 stitched or tacked at 51 or otherwise hemed in place. The cover screen 48 is attached on the frame 12 simply by feeding the members 22, 24 through the hem 50 somewhat like running a drawstring through a hem. If desired, the hem 50 may be left on one of the members 22 by bunching the hem up thereon, or the entire material 48 is readily removable for other use, such as a beach towel or sun shelter. Accordingly, the material 48 may be of absorbent, soft material so that it may be used as a towel when not in use with the present cover screen arrangement.

The assembly of and positioning for the device 10 is done quickly by inserting members 22, 24 by their ends 26, 28 into the respective sockets 36, 38 and 40, 42 after first having threaded the hem 50 of the cover screen material 48 on one of the members 22, 24. Then the lip or tab 44 is hung into engagement with the gutter strip 18, as is seen in FIG. 4, with the rubber bumper 47 contacting the side of the automobile 16. The weight of the curtain member 48 downwardly pushes bumper 47 against the car and holds the lip 44 in engagement on the gutter strip 18. The curtain 48 can be adjusted equally around the members 22, 24 and moved back when entering and exiting from the area inside the closed space.

While I have shown and described a preferred form and embodiment of my invention, this is not to be construed from the language used or the expressions presented in the drawings as defining the scope of coverage of my invention or as any limitation on the scope of invention, reference being made to the appended claim for a determination of coverage since many alternations, changes, substitutions, eliminations, changes and revisions may be made in the embodiment shown and described.

I claim:

A detachable support device for a portable and collapsible dressing arrangement which may be attached on the rain drip edge or other similar edge of a conventional automobile or other similar support, and wherein said collapsible dressing arrangement includes a flexible screen or curtain-like device such as a conventional, large beach towel having a hemmed edge along one side thereof, a substantially flat support plate member having an upper plate portion with a pair of retaining members thereon spaced from each other at the front thereof and each adapted to receive a support therein, said plate member having an attachment lip thereon protruding from the back thereof below said retainer members and being curved to fit over the drip edge, said lip thereby being adapted to be attached on and removed from the drip edge of an automobile or similar support, an elongated and detachable frame member of substantially arcuate formation adapted to form a continuous enclosure and having two ends, each one being supported on said support plate, one end of said frame member being formed to detachably attach on said retainer member and the other end of said frame member similarly being formed for attachment on the other of said retainer members on said plate, both of the ends of said frame member being readily removable from said plate, said frame member when attached in place on said plate extending outwardly therefrom above the ground forming an arcuate support area protruding from said bracket and said frame being located above said lip on said plate thereby tending to pull said lip downwardly into the support edge when supporting a screen thereon, the bottom of said plate member extending below said attachment lip and being pushed against the automobile whenever there is the weight from a flexible screen or curtain member supported on said frame.

References Cited in the file of this patent

UNITED STATES PATENTS

| | | |
|---|---|---|
| 1,376,218 | Morant | Apr. 26, 1921 |
| 1,803,237 | Crooke | Apr. 28, 1931 |
| 1,841,002 | Bell | Jan. 12, 1932 |
| 1,935,948 | Hyrup | Nov. 21, 1933 |
| 2,027,551 | Rideout | Jan. 14, 1936 |
| 2,315,680 | Ward | Apr. 6, 1943 |
| 2,770,244 | Carson | Nov. 13, 1956 |
| 2,829,661 | Crot | Apr. 8, 1958 |